UNITED STATES PATENT OFFICE.

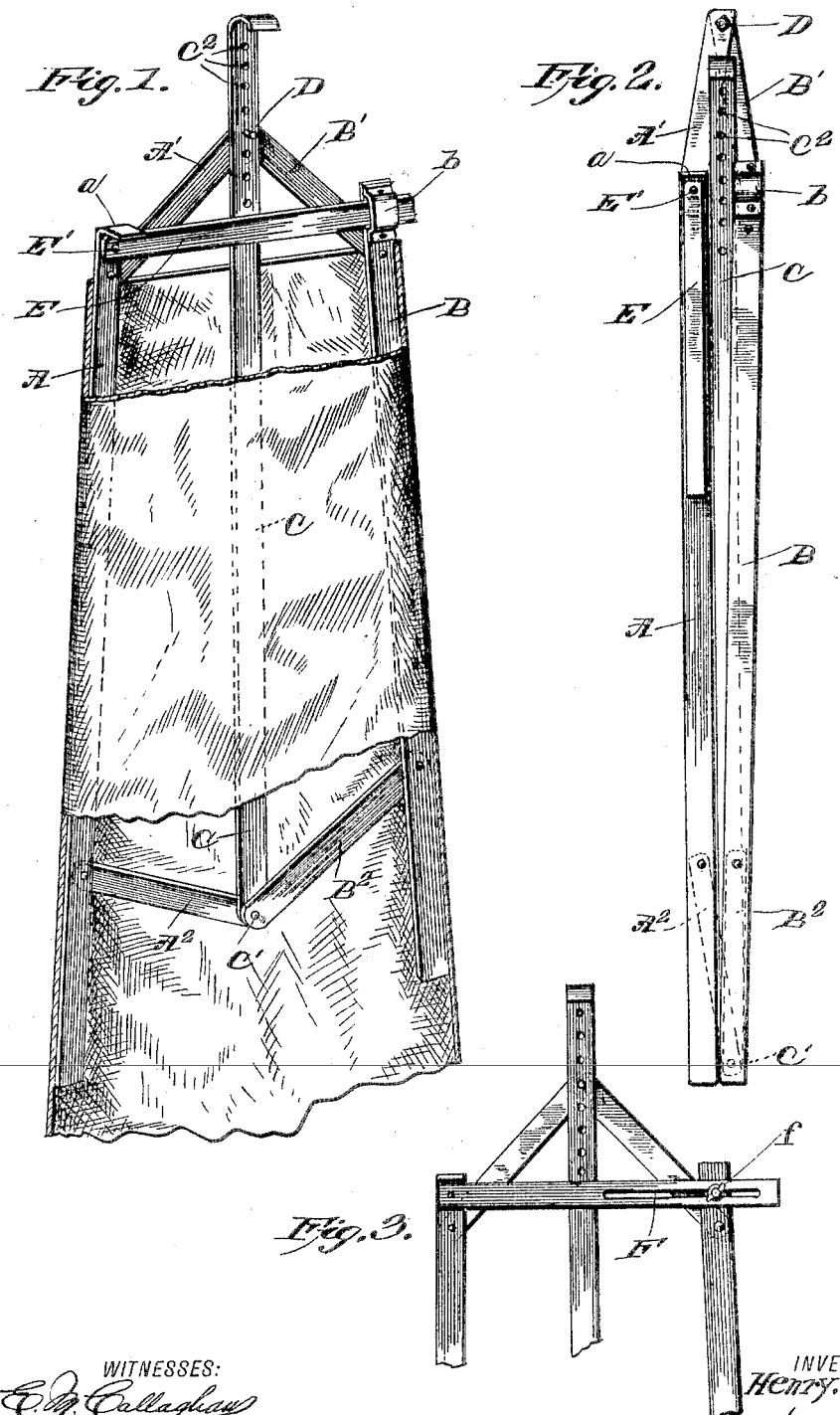

HENRY CLAY WARFEL, OF PHILIPSBURG, PENNSYLVANIA, ASSIGNOR OF ONE-HALF TO HENRY McDONALD LORAIN, OF PHILIPSBURG, PENNSYLVANIA.

TROUSERS STRETCHER AND CREASER.

No. 797,476.　　　Specification of Letters Patent.　　　Patented Aug. 15, 1905.

Application filed March 1, 1905. Serial No. 247,927.

*To all whom it may concern:*

Be it known that I, HENRY CLAY WARFEL, a citizen of the United States, residing at Philipsburg, in the county of Center and State of Pennsylvania, have made certain new and useful Improvements in Trousers Stretchers and Creasers, of which the following is a specification.

My invention is an improvement in trousers stretchers and creasers; and the invention consists in certain novel constructions and combinations of parts, as will be hereinafter described and claimed.

In the drawings, Figure 1 is a perspective view of the invention as in use, parts being broken away and others shown in section. Fig. 2 is a front elevation of the stretcher collapsed; and Fig. 3 is a front elevation of one end of the stretcher, showing a somewhat different means for connecting the locking-bar at one end with the side bar from that shown in Fig. 1.

The device is adapted for use both for stretching and creasing trousers, is readily collapsible, so it can be folded in a small space, can be readily adjusted at one end to a desired width and be locked in such adjustment and be then spread at its opposite end to stretch the trousers, and can be fastened in stretched position, as will be more fully described hereinafter.

As shown, the stretcher includes side bars A and B, which are connected near one end by toggle-bars A' and B' and near their lower ends by toggle-bars $A^2$ and $B^2$, and an operating-bar C extends between the side bars A and B, is connected at one end at C' with the toggle-bars A' and B' at the meeting ends of the latter, and is connected adjustably at its other end with the toggle-bars $A^2$ and $B^2$ by means of a series of perforations $C^2$ in the bar C fitting over the stud D, extending from the bars A and B at the juncture of the latter, as shown in Fig. 1.

In stretching trousers and creasing them but a slight stretching effect can be secured at the lower end of the trousers-leg where the hem braces the leg, and it is important to provide means for securing the smaller end of the stretcher when adjusted to the desired degree of tightness within the lower end of the trousers-leg in such position, and to this end I provide what for convenience of reference I call the "locking-bar" E, which extends between the side bars of the stretcher at the smaller end of the latter, is connected at E' pivotally with the side bar A near the end of the latter, and connects at its other end with the bar B, as shown. As preferred, the bar A is provided at its end with a flange *a*, turned at a right angle to the bar A and overlying the locking-bar E in such manner as to form a keeper to limit the upward swinging of the bar E to a right angle with the bar A, as shown in Fig. 1 of the drawings, but permits the said bar E to drop down in the collapsed adjustment of the parts, as shown in Fig. 2. In connecting the free end of the cross-bar E with the side bar B, I may provide the side bar B with a loop or keeper *b*, in which the locking-bar E binds at its free end, as will be understood from Fig. 2 of the drawings, or I may in some instances slot the locking-bar longitudinally at F and provide a screw-stud and thumb-nut *f* for clamping the locking-bar to the side bar of the stretcher, as will be understood from Fig. 3 of the drawings.

In the operation of the construction shown in Fig. 1 it will be noticed that when the smaller end of the stretcher is spread within the trousers-leg to the desired position and the operating-bar C is drawn upon to spread the opposite end of the stretcher by means of the toggle-bars A' and B', pressure being meantime exerted against the toggle-bars $A^2$ and $B^2$ in opposition to the stretching action, the side bar B will be operated upon by the locking-bar E in such manner as to cause its keeper *b* to bind upon the locking-bar E in such manner as to prevent any expansion or contraction of the pressure at its smaller end, so that the stretching force can be exerted against the opposite end of the stretcher in order to take the bag out of the trousers and to produce a creasing action when the trousers are moistened along the edges of the stretcher, as is well known in the art. As before suggested, when a stretcher is inserted in a trousers-leg and its lower or smaller end spread to the desired adjustment within the hemmed lower end the locking-bar will bind in the keeper and hold its end of the stretcher in the desired adjustment, while the operating-bar may be drawn to spread the opposite end of the stretcher as desired.

The construction is simple, can be cheaply made, will efficiently serve its purpose, and can be easily collapsed in small space and readily adjusted to position for use.

What I claim is—

1. A trousers stretcher and creaser substantially as herein described, comprising the opposite side bars, provided at their ends opposite each other, the one with a laterally-projecting flange and the other with a keeper, the locking-bar pivoted to one of said side bars beneath its flange and adapted to be limited in movement thereby, and movable longitudinally within the keeper in expanding the stretcher, toggle-bars connecting the side bars at one end, the pair of toggle-bars connecting the side bars, and an operating-bar connected with one pair of toggle-bars and interlocking adjustably with the other pair of toggle-bars, substantially as and for the purpose set forth.

2. The combination in a trousers stretcher and creaser, of the opposite side bars, the operating-bar, and toggle-bars between the opposite side bars, and a locking-bar extending transversely between the side bars, said locking-bar being pivoted at one end to one of the side bars and movable at its other end across the opposite side bar, substantially as set forth.

3. The combination in a trousers stretcher and creaser, of the side bars, the toggle-bars extending between the side bars, the operating-bar, and a locking-bar connected at one end with one side bar and adapted to extend across to the opposite side bar, and means for connecting such end of the locking-bar with the opposite side bar substantially as set forth.

4. The combination with the opposite side bars, one of which has a lateral flange and the toggle-bars and operating-bar between such side bars, of the locking-bar pivoted to the side bar adjacent to said lateral flange, and means for connecting the free end of the locking-bar with the opposite side bar, substantially as set forth.

5. The combination in a trousers stretcher and creaser, with the opposite side bars, the operating-bar and the toggle-bars between the opposite side bars, of a locking-bar connected at one end to one of the side bars and adapted to extend transversely across the opposite side bar and slidable across the same, and means connecting said locking-bar with said opposite side bar, substantially as and for the purposes set forth.

6. A trousers stretcher and creaser, comprising the opposite side bars, toggle-bars between the opposite side bars, and a locking-bar pivoted at one end to one of the side bars and movable at its opposite end longitudinally across the opposite side bar and a keeper on said opposite side bar within which the locking-bar is held to the side bar, and through which the locking-bar may move longitudinally in a direction transverse the said side bar, substantially as and for the purposes set forth.

HENRY CLAY WARFEL.

Witnesses:
G. G. POTTSGROVE,
M. G. POTTSGROVE.